(12) United States Patent
Florence

(10) Patent No.: US 12,467,647 B1
(45) Date of Patent: Nov. 11, 2025

(54) THERMAL CONVECTION CONVERSION SYSTEM

(71) Applicant: Thomas Florence, West Dennis, MA (US)

(72) Inventor: Thomas Florence, West Dennis, MA (US)

( * ) Notice: Subject to any disclaimer, the term of this patent is extended or adjusted under 35 U.S.C. 154(b) by 489 days.

(21) Appl. No.: 18/074,465

(22) Filed: Dec. 3, 2022

(51) Int. Cl.
| F24F 7/06 | (2006.01) |
| E04B 1/76 | (2006.01) |
| E04B 1/78 | (2006.01) |
| E04B 2/56 | (2006.01) |
| E04B 5/02 | (2006.01) |
| E04B 5/48 | (2006.01) |
| F24F 7/00 | (2021.01) |

(52) U.S. Cl.
CPC ............ *F24F 7/06* (2013.01); *E04B 1/76* (2013.01); *E04B 1/78* (2013.01); *E04B 2/56* (2013.01); *E04B 5/02* (2013.01); *E04B 5/48* (2013.01); *F24F 2007/004* (2013.01); *F24F 2221/34* (2013.01)

(58) Field of Classification Search
CPC .... F24F 7/06; F24F 2007/004; F24F 2221/34; E04B 1/76; E04B 1/78; E04B 2/56; E04B 5/02; E04B 5/48
USPC ........................................................ 454/231
See application file for complete search history.

(56) References Cited

U.S. PATENT DOCUMENTS

| 1,086,031 | A * | 2/1914 | Davis ................. E06B 1/58 454/339 |
| 3,905,548 | A * | 9/1975 | Brodie ............... F24D 5/10 52/646 |
| 4,136,606 | A * | 1/1979 | Wolbrink ............ F24F 7/065 454/231 |
| 4,856,238 | A * | 8/1989 | Kesting ............. E04G 21/22 52/505 |
| 5,941,767 | A * | 8/1999 | Fukuda .............. F24F 7/065 454/230 |
| 7,475,558 | B2 * | 1/2009 | Perry ................. F24F 11/70 454/231 |
| 7,578,534 | B2 * | 8/2009 | Wuerfel, III ........ F25D 17/005 296/24.35 |
| 8,894,478 | B1 * | 11/2014 | Stillwagon ......... F24F 1/0071 454/231 |
| 10,921,006 | B2 * | 2/2021 | Gheyri ............... F24F 11/46 |
| 12,264,474 | B2 * | 4/2025 | Frantz ............... E04B 9/363 |

* cited by examiner

*Primary Examiner* — Avinash A Savani
*Assistant Examiner* — Dana K Tighe
(74) *Attorney, Agent, or Firm* — John P. McGonagle

(57) ABSTRACT

A thermal convection conversion system is provided. The system includes the installation of one or a plural of induction vents at floor level. Cold air at the floor level is drawn into a vertical stud cavity in a wall framing using an intake fan. The vertical stud cavity serves as a duct to allow the cold air to be drawn upward to a top plate of the wall framing. The top plate is modified with a steel supporting bracket that allows passage for the cold air to access a plurality of plenum spaces created between the ceiling joists and ceiling material, such as drywall or plaster. An exhaust duct is formed in an opposite wall, gathering air from the plenum spaces and exhausting the air through a vent at the floor level.

2 Claims, 12 Drawing Sheets

THERMAL CONVECTION CONVERSION SYSTEM

BACKGROUND OF THE INVENTION

This invention relates to home and commercial structures, and in particular, to a system for recycling heat energy lost within structures using conventional construction designs and current building codes.

In home and commercial structures heat sources generally originate from a basement furnace or a room space heater. In enclosed structures, most heat loss occurs by convection from the floor up through ceilings and upper wall areas. As air is warmed in an enclosed structure the warmed air rises to the ceiling while colder air settles to the floor. Energy used to warm air is expended as it warms the building materials at the ceiling and consequently is lost through convection.

To prevent such energy loss ceilings and roof areas are typically heavily insulated to slow energy loss passing through framing and insulation materials. Other prior art methods used to take advantage of warmed air at the ceiling level include fans or ducting systems that capture warmed air at the ceiling area and force the warm air back to the floor level. However, prior art methods are generally ineffective as the warmed air quickly returns to the ceiling area. Further, as the warm air is forced downward it disrupts the lower colder air destabilizing contrasting temperatures resulting in unwanted drafts.

SUMMARY OF THE INVENTION

Thermal convection conversion is a passive method to recycle heat energy from any heating source. Global concerns over the use of fossil fuels and climate change have turned attention to alternative and sustainable sources of energy. Conserving energy regardless of its source is a practical matter. In recent times better insulation and weather proofing have been utilized in new building construction as well as upgrading existing structures.

Preferred air temperatures in enclosed spaces vary. Typically a thermostat is placed in the area of the average mean temperature in an enclosed space to maintain a desired comfort level. In a heated space the average mean temperature is generally at the center point between the floor and ceiling. However the warmest air is always at the ceiling and the coldest air at the floor. As an example: Assuming 70 degrees is the desired temperature set at the mid-point of an enclosed space. Temperatures at the ceiling would consistently average 85-90 degrees. Temperatures at the floor would average a consistent 55-60 degrees. A differential in temperatures of air currents at various levels can produce air contrasts by as much as 30 degrees. See FIG. 1.

Conventional heating systems warm air and typically create inconsistent air flow patterns and also do not compensate for heat energy loss dissipated by convection. Conventional heat sources ignite when triggered by a signal from a thermostat. The signal indicates the temperature has dropped below the desired level in the area of the average mean temperature. The heat source ignites and warms the air to the desired temperature in cycles as necessary to keep warm air in the enclosed space.

Warmed air rises and bypasses occupants to provide comfort then gathers at the ceiling. The warmed air then warms the ceiling and building materials. Typically insulating materials are used to maintain the heat energy within an enclosed space. However the heat energy passes through the warmed building materials including plaster, wood or steel framing, as well as insulation and is then lost into the space above through convection.

To reduce conventional patterns of preventable start and stop phases of energy use and loss through convection has heretofore generally been overlooked. The thermal convection conversion system as described in the present invention captures heat energy initially used to warm air in the first place and recirculates it a multiple of times using a fan and vent system combined with a built-in ceiling plenum.

As described in the foregoing example, if the desired temperature is 70 degrees the system ceiling plenum air space will average a consistent 85-90 degrees. As a practical matter all lifestyle activities take place in the lowest portion of a living space where the coldest air subsides. The present invention system is ancillary to all heating sources and will control and recycle natural air flow patterns with a passive low voltage fan driven recirculating system. The present invention system uses intake fans to evacuate cold air from the floor level. The system circulates the cold air drawn into a built-in plenum at the ceiling.

The heat source energy trapped in the built-in plenum is recycled as it warms the cold air drawn from the lower level of the enclosed space. The cold air is warmed as it is circulated through the plenum system. An exhaust fan at the floor level on an opposite side of the enclosed space draws the cold air across the ceiling plenum. The warmed air is exhausted and recirculated with the cold air starting at the floor level on an opposite wall. Therefore the heat energy stored in the plenum is recycled before it can dissipate through the ceiling or upper wall areas. See FIG. 2.

The present invention system encompasses a unique stand-alone process designed to work in conjunction with any heating source to conserve energy. Irrespective of the heat source whether comprised of central heating systems, solar, room space heaters etc., the present invention system conserves heat source energy generally lost through convection.

Unlike conventional air flow patterns when air is recirculated through the present invention fan and vent system a convection loop is formed within an enclosed area. The convection loop blends the natural contrasting warm and cold air masses providing a thermal dynamic balance of air within a closed environment. The process of cycling cold air away from the lowest levels and blending warm air into the lowest levels mitigates the rise of the warmed air in an enclosed space. As a result the warmed air lingers lower and longer in the critical area demanding heat. This process results in fewer firings of the heat source thereby conserving energy and also providing an enhanced comfort level consuming less energy.

In addition to conserving heat energy loss through convection, other known mitigating factors upsetting desired temperature and comfort levels in an enclosed space are due to drafts created by unstable air currents. Methods to prevent drafts and unstable air currents are commonly addressed in enclosed spaces through air sealing techniques such as caulking small holes or cracks in and around window and door openings etc.

However destabilizing air currents occur as a result of typical activities such as opening doors or windows and the stopping and starting of heat source cycles. Any disruption of air even walking through an enclosed space can disrupt cold air at the floor and produce contrasting comfort levels. Cold and warm air passively circulated through the present invention system is blended in a convection loop minimizing contrasting air currents and develops a thermal dynamic air stabilization process that mitigates drafts.

Irrespective of the heat source the present invention system operates ancillary to and separate from all heating and cooling systems. The present invention system can also operate to moderate air conditioned spaces by exhausting heated air from the ceiling plenum directly to the outdoors.

The present invention vent system is adaptable for high efficiency particulate air filtration (HEPA). HEPA filtration can remove 99.97 percent of dust, pollen, mold, bacteria and any airborne particles with to a size of 0.3 microns. The present invention system may also be adapted to dispense fragrances. The combined elements of the present invention system produce energy savings as well as a more comfortable and safe indoor environment.

Other commonly known methods to circulate warmed air from a ceiling area are HVAC systems and ceiling fans. HVAC systems are typically a combination of an integrated heating source and ductwork. HVAC systems operate by circulating air through a heating and cooling unit and release the air back into the enclosed space. HVAC systems do not include a solely independent built-in plenum system. And typically do not address or harvest heat loss through convection. Also HVAC systems generally force processed air back into the enclosed space with repetitive air rising and sinking results. HVAC systems also work to blend a mixture of warm and cold air that does not result in a stable convection loop with minimal disruption of the conflicting air masses.

Ceiling fans essentially force warmed air downward resulting in an uncontrolled disruption of the contrasting air masses such as a blender. Ceiling fans generally introduce a mixture of destabilized warm and cold warm air and can induce drafts resulting in unpredictable comfort levels.

The present invention system operates independently of all heating and cooling systems and is designed to work in conjunction with any heating source including HVAC systems. The present invention system is designed to be built into new structures and can also be easily remodeled into and into an existing structure. The present invention system can be controlled both manually or using contemporary remote operation technology.

In circumstances where on-site construction is not practical or a low cost easy to install energy saving device is desired, the present invention system can provide an optional portable air exchange system that can provide similar benefits. The portable system will mitigate heat loss through convection but does not utilize a built-in plenum. The portable system will develop a convection loop and provide thermally balanced air stability in an enclosed space. The units adjust to various ceiling heights and also operate independently of a heating system. The portable units also have adaptable vents to provide air filtration and fragrance options. The units can be moved from room to room as desired.

To overcome the limitations of the prior art, the present invention combines ductwork and a plenum built within a structure's framing system. Heat energy penetrating building materials through convection is captured by a built in plenum to create a passive convection loop and modify air flow within a structure.

The present invention is a system used to recycle heat energy lost within structures using conventional construction designs and current building codes. The present invention is a stand-alone system designed to be used as a supplement to any heating system. The present invention is an energy saving method and is most effective when installed in prefabricated and manufactured building components. The present invention can also be installed in conventionally constructed structures and can be panelized or built and installed in existing structures.

The thermal convection conversion system involves the installation of one or a plural of induction vents at the floor level. Cold air at the floor level is drawn into a vertical stud cavity in a wall framing using an intake fan. The vertical stud cavity serves as a duct to allow the cold air to be drawn upward to a top plate of the wall framing. The top plate is modified with a steel supporting bracket that allows passage for the cold air to access a plenum space created between the ceiling joists and ceiling material, such as drywall or plaster. Drywall and plaster are dense materials with high heat retention qualities.

The plenum air space is created by installing an insulating membrane secured to the bottom of the ceiling joist framing. Strapping or slats are then secured perpendicular to the ceiling joists under the membrane running to the opposite wall. The ceiling material is then secured between the membrane and the ceiling material. The strapping or slates attached to the membrane and joists are spaced as needed to insure a level ceiling below. The spaces between the ceiling strapping/slats comprise the plenum air space running laterally to an opposite wall.

A cold air intake fan at the floor level draws cold air from the floor level and pushes the cold air upward into the ceiling plenum air space. The cold air is warmed as it passes through the plenum air space over the ceiling materials until it reaches the opposite wall. The top plate at the opposite wall is modified to allow the warmed air into a vertical stud cavity in the opposite wall. A baffle joist is installed approximately two inches from the opposite wall to insure sufficient draw into the opposite wall stud cavity. The top plate at the opposite wall stud cavity is modified with a steel bracket to allow the warmed air to be drawn downwardly by an exhaust fan installed to the floor level of the opposite wall. The warmed air is pushed out of an exhaust vent at the floor level of the opposite wall stud cavity and is integrated with the cold air at the floor. Heat energy in the warmed air, normally lost through convection, is returned to the desired space in the form of a passive convection loop.

The thermal convection conversion system results in significant energy savings. The invention system recycles heat normally lost through convection. As the cold air at the floor level is replaced with warm air drawn through the framing plenum system to the lower portion of the structure, the exchange of air flowing through the convection loop creates a thermos dynamic balance of air from floor to ceiling. Warm air drawn through the framing plenum mitigates drafts commonly resulting from disruptions of cold air at the floor providing a uniformly stable warmer atmosphere.

These together with other objects of the invention, along with various features of novelty which characterize the invention, are pointed out with particularity in this disclosure. For a better understanding of the invention, its operating advantages and the specific objects attained by its uses, reference should be made to the accompanying drawings and descriptive matter in which there is illustrated a preferred embodiment of the invention.

DETAILED DESCRIPTION OF THE INVENTION

Figure 1:
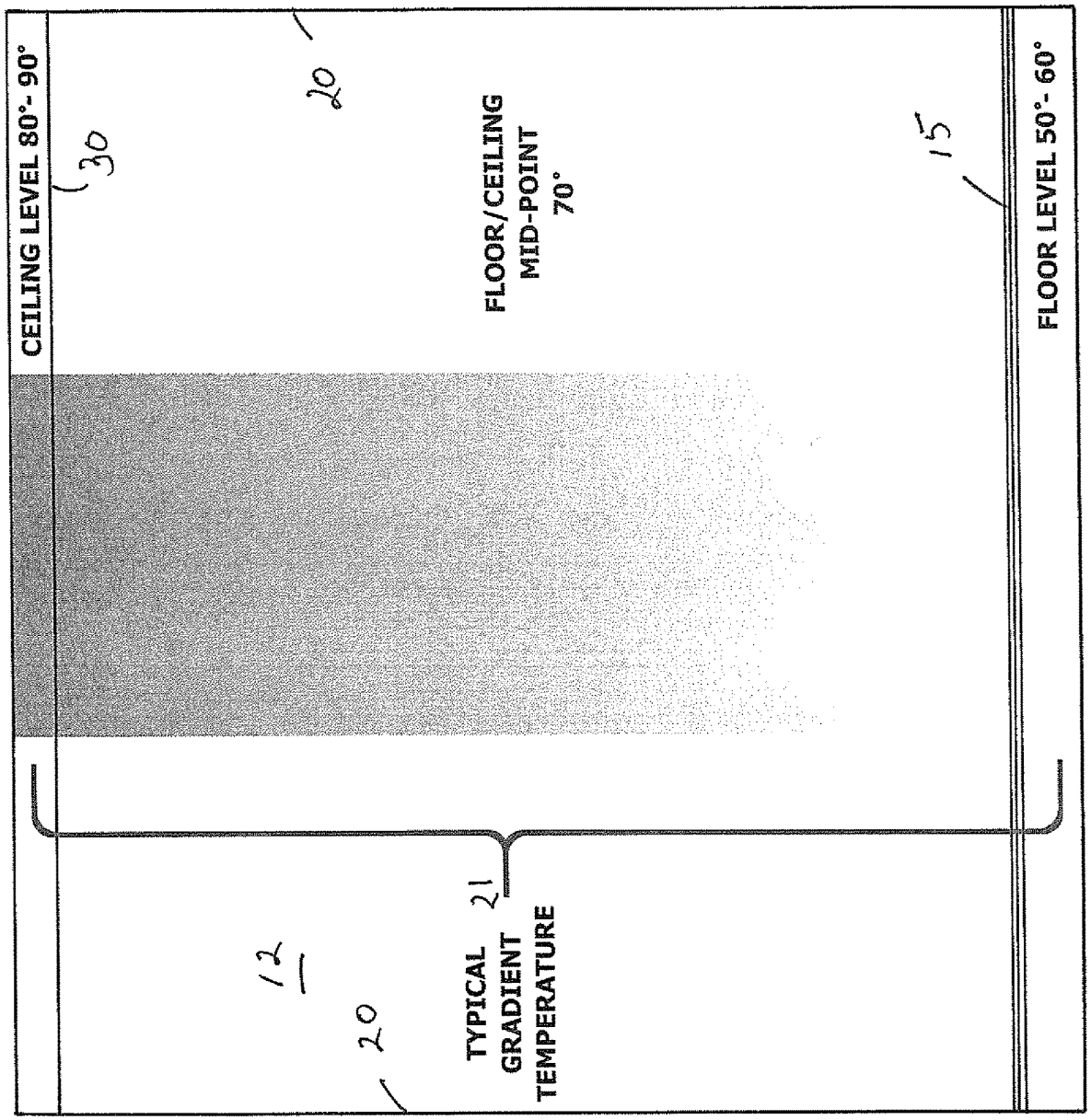
FIG. 1 is a diagram of an average heated space.
Figure 2:
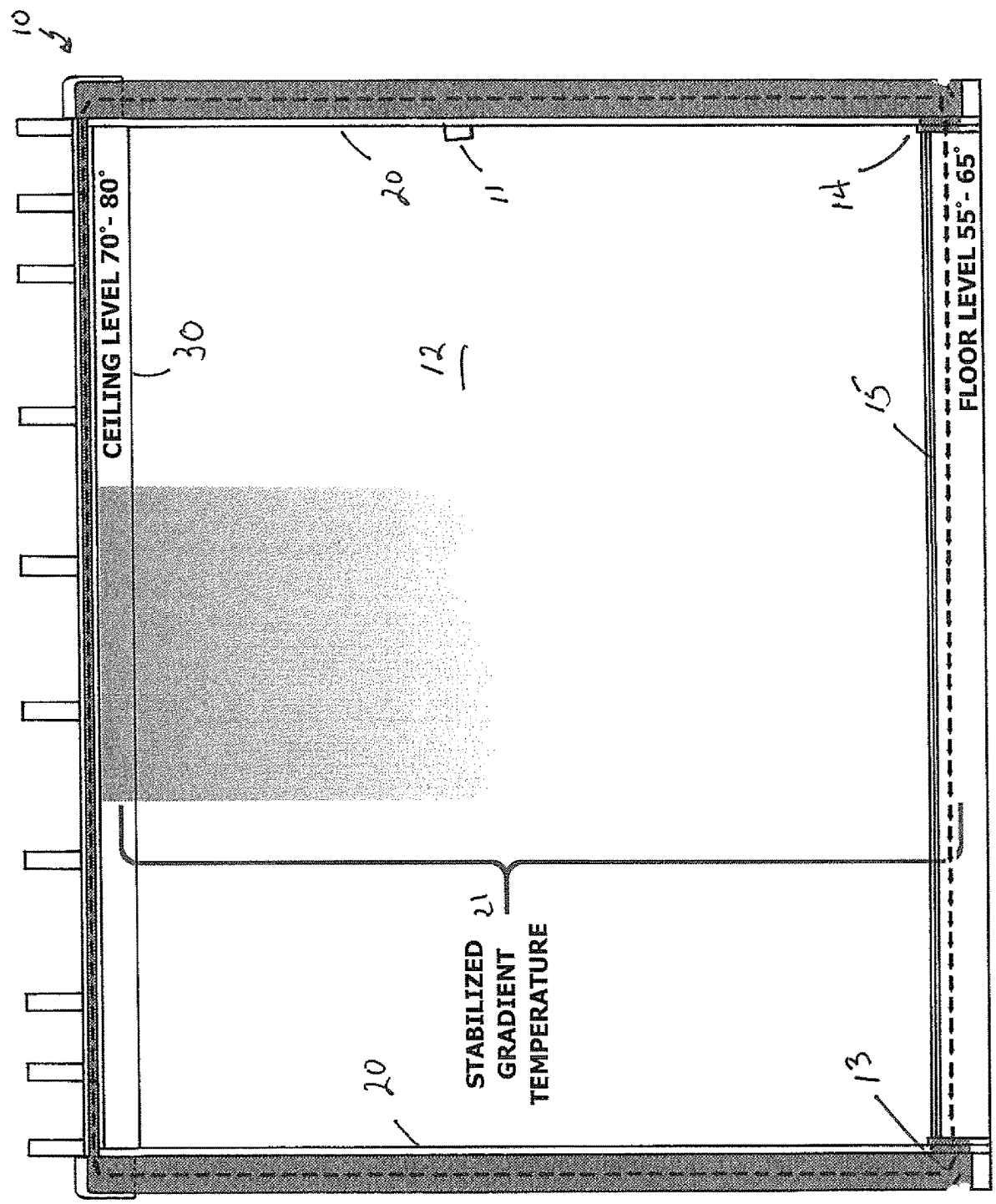
FIG. 2 is a diagram of an average heated space with the invention.
Figure 3:
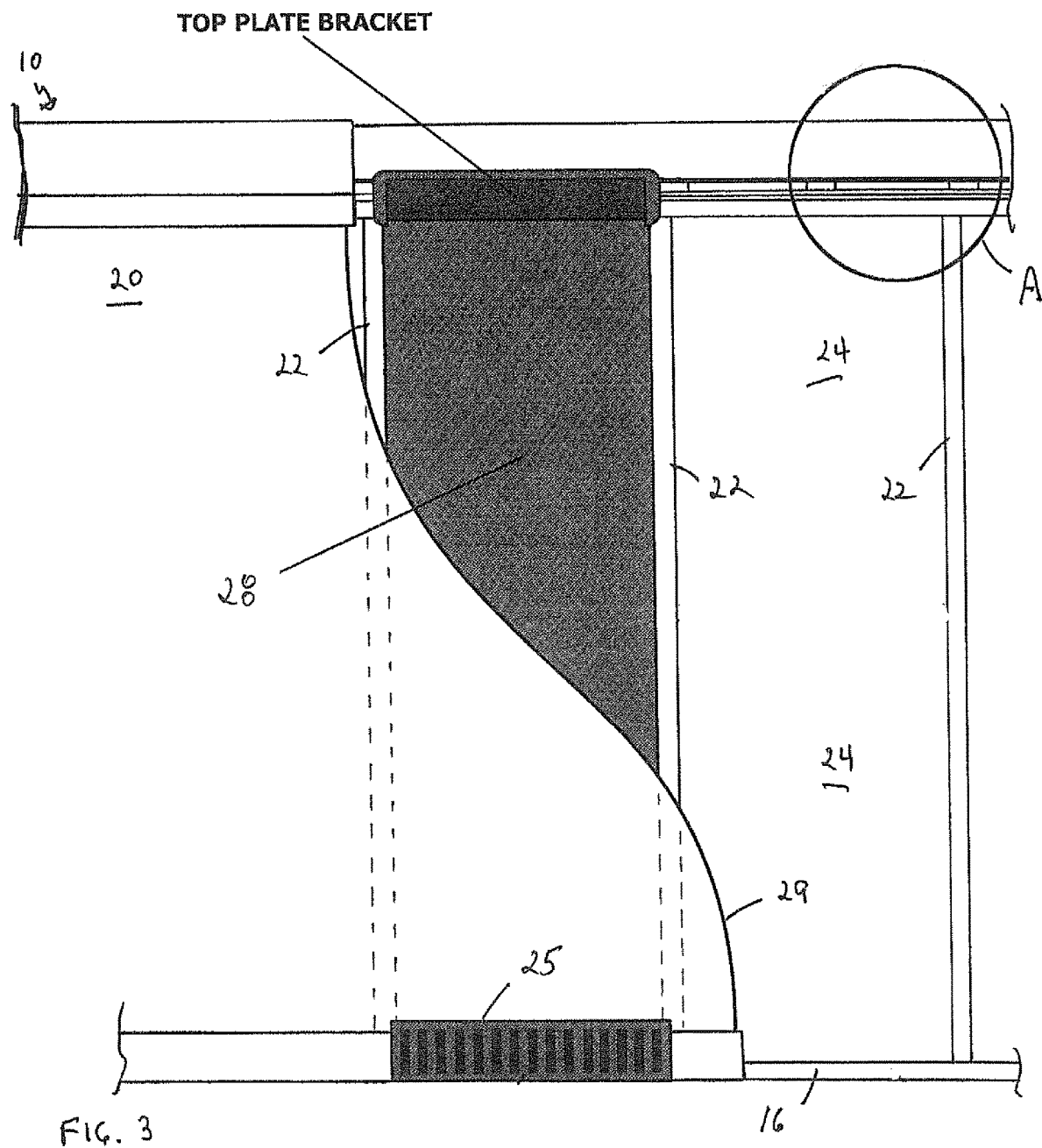
FIG. 3 is a section view of an intake stud cavity air duct.
Figure 4:
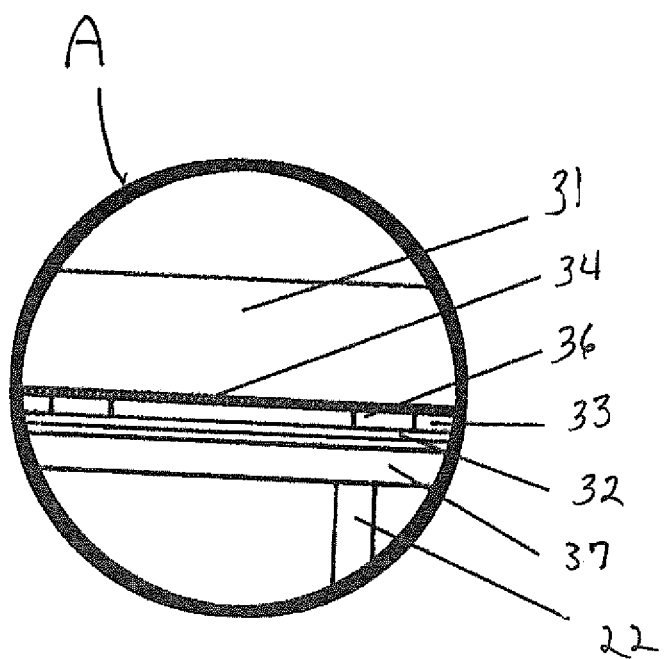
FIG. 4 is a close up view of Section A of FIG. 3
Figure 5:
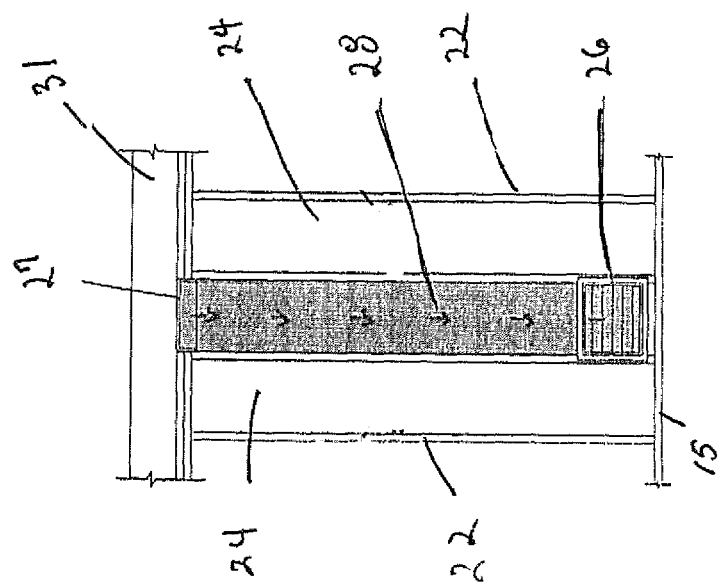
FIG. 5 is a section view of an exhaust stud cavity air duct.
Figure 6:
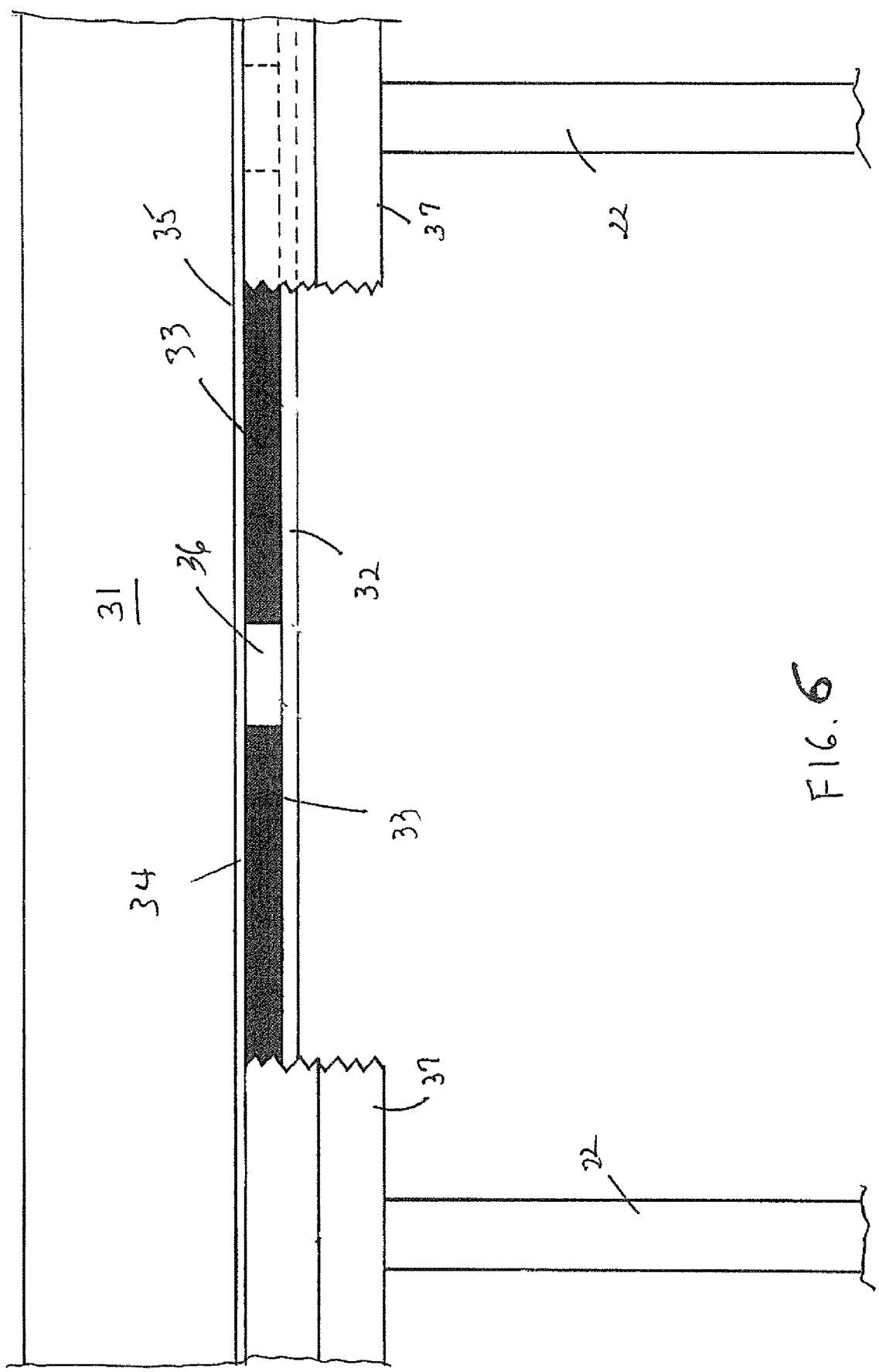
FIG. 6 is a ceiling air plenum, partly in section.
Figure 7:
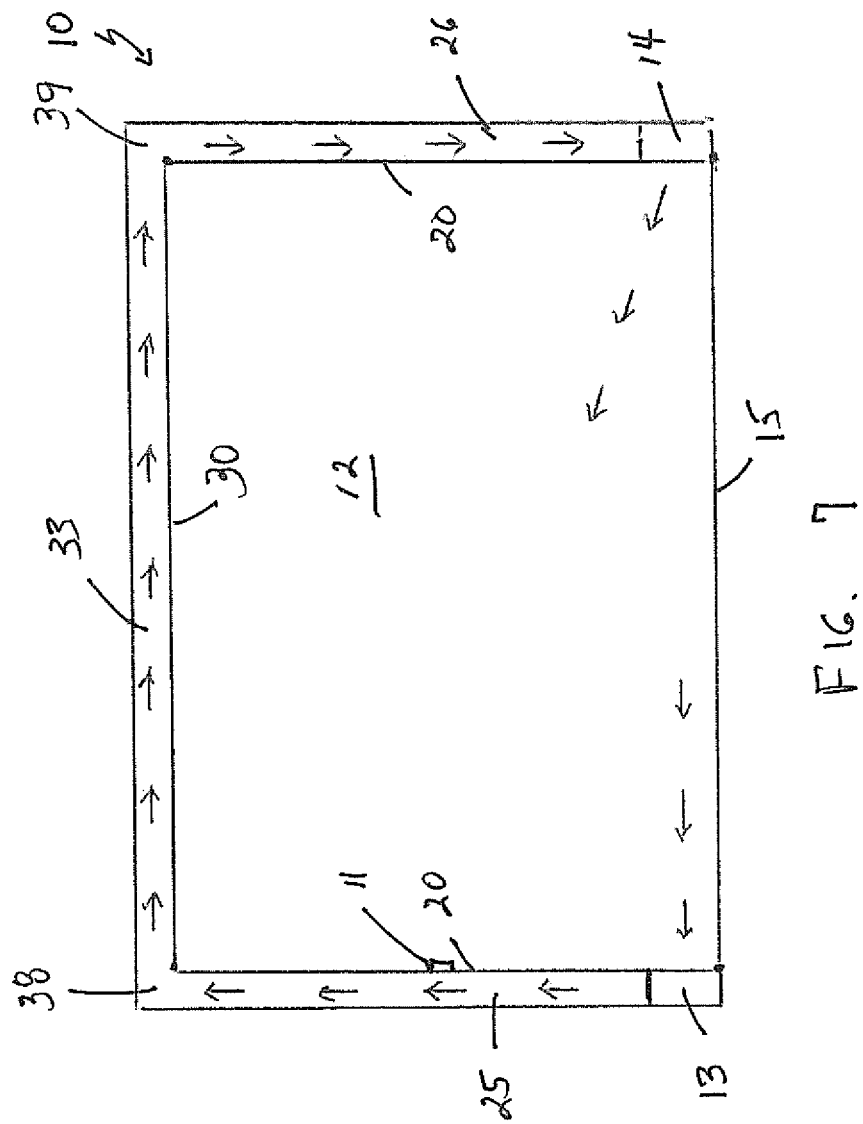
FIG. 7 is a diagrammic view of the system air flow.
Figure 8:
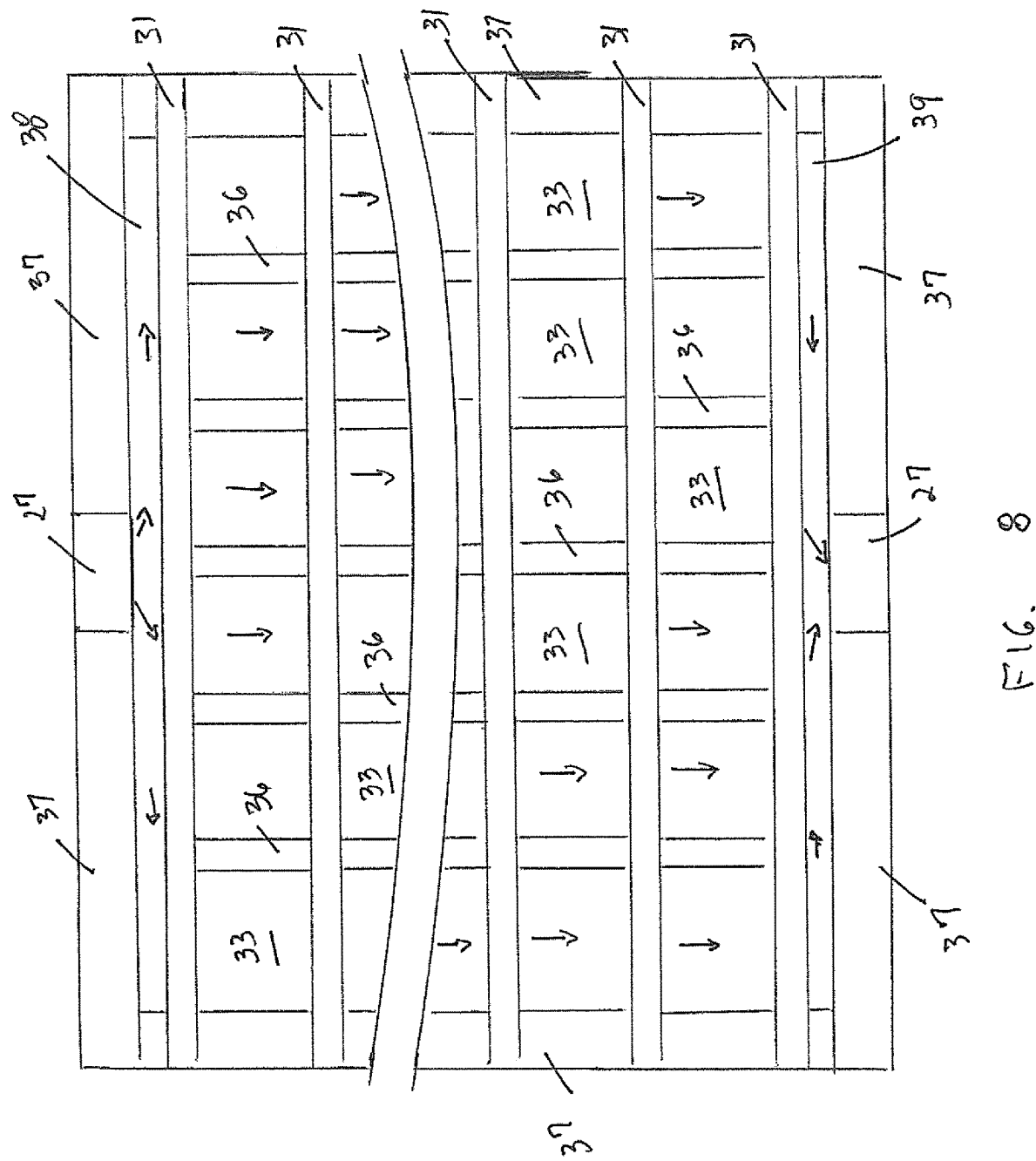
FIG. 8 is a top ceiling plan view, partly in section.

Referring to the drawings in detail wherein like elements are indicated by like numerals, there is shown a typical room structure 10 comprising a floor 15, four or more walls 20 and a ceiling 30, said floor, walls and ceiling defining a room interior 12. Heat is typically provided to the room interior 12 by heat sources (not shown) adjacent the floor such as floor vents, base boards, radiators, and the like. The heat provided will rise through convection and gather at the ceiling 30. Heat thermostats 11 are typically installed on one of the walls 20 at about a vertical midpoint 21. The heat dispersal in the room is, therefore, cooler at the floor and warmer at the ceiling 30, with the desired heat setting being at the thermostat positioned vertical midpoint 21.

In a typical room structure, the walls 20 are comprised of a plurality of vertical studs 22, evenly spaced about the perimeter of the room 10, said studs terminating at the ceiling level at a top plate 37 and at the floor level on a bottom plate 16. The gaps 24 between studs 22 may be filled with an insulating material (not shown). The stud structure will then typically be covered with a wall board material 29 facing the room interior 12.

A typical room structure ceiling 30 will be comprised of a plurality of parallel joists 31 extending from a first side wall top plate 37 to an opposite second side wall top plate 37. An insulating membrane 34 is attached to the joist bottoms 35. A plurality of strapping strips 36 is then attached through the insulating membrane 34 to the joist bottoms 35, each said strapping strip 36 having a longitudinal axis transverse to the longitudinal axis of the joists 31. The strapping strips 36 extend from a first joist and terminates at a last joist. A ceiling material 32 is then attached to the strapping strips 36, thereby covering the entire top of the room interior 12. A plurality of air plenums 33 is created between the strapping strips 36, wherein each air plenum is defined by two adjacent strapping strips 36, the insulating membrane 34 and the ceiling material 32.

The present invention modifies a room structure's walls 20 and ceiling 30 to create a thermos convection conversion system made up of a convection loop wherein heat generated by the warmer air at the room's ceiling is circulated to the room's floor level.

The system is comprised in part of a plurality of air plenums 33 created at the ceiling 30. The system is further comprised of a first air space 38 created between the first joist and adjacent structural top plate 37, and a second air space 39 created between the last joist and its adjacent structural top plate 37. The air plenums 33 interconnect with the first and second air spaces.

The system is further comprised of an intake vent 25 and an exhaust vent 26. Each vent is formed on opposite walls, adjacent to the floor 15, and is comprised of a vertical cavity 28 between two adjacent studs 22. The insulation is removed. Each vertical stud cavity terminates in a top plate 37 modified with a steel supporting bracket 27 allowing air passage to and from the first or second air spaces 38, 39. The intake vent 25 may have an intake fan 13 at the floor level to draw cold air at floor level into the stud cavity 28, into the first air space 38, through the air plenum 33, into the second air space 39, down to an exhaust vent at floor level wherein warmed air is disbursed into the room interior 12 at the floor level. The exhaust vent may have an exhaust fan As the air passes through the air plenum heat energy from the ceiling materials heats the passing air.

While a thermal convection conversion system is recirculating heat energy normally lost through convection, the primary heat source thermostat will not call for the heat source to ignite until warmed air from the ceiling plenum is expended. Hepa air filters may be installed at the vents to provide healthy air quality and also for fragrance atomization.

Thermal convection conversion systems are designed to be ancillary to conventional heating sources and function independently, but may also be integrated with existing heating and cooling thermostats. The invention system can be optionally operated manually, electronically or activated remotely. The invention system may also serve as a supplement to aid in cooling structures by installing an exhaust vent to the outdoors at the ceiling level.

Figure 9:
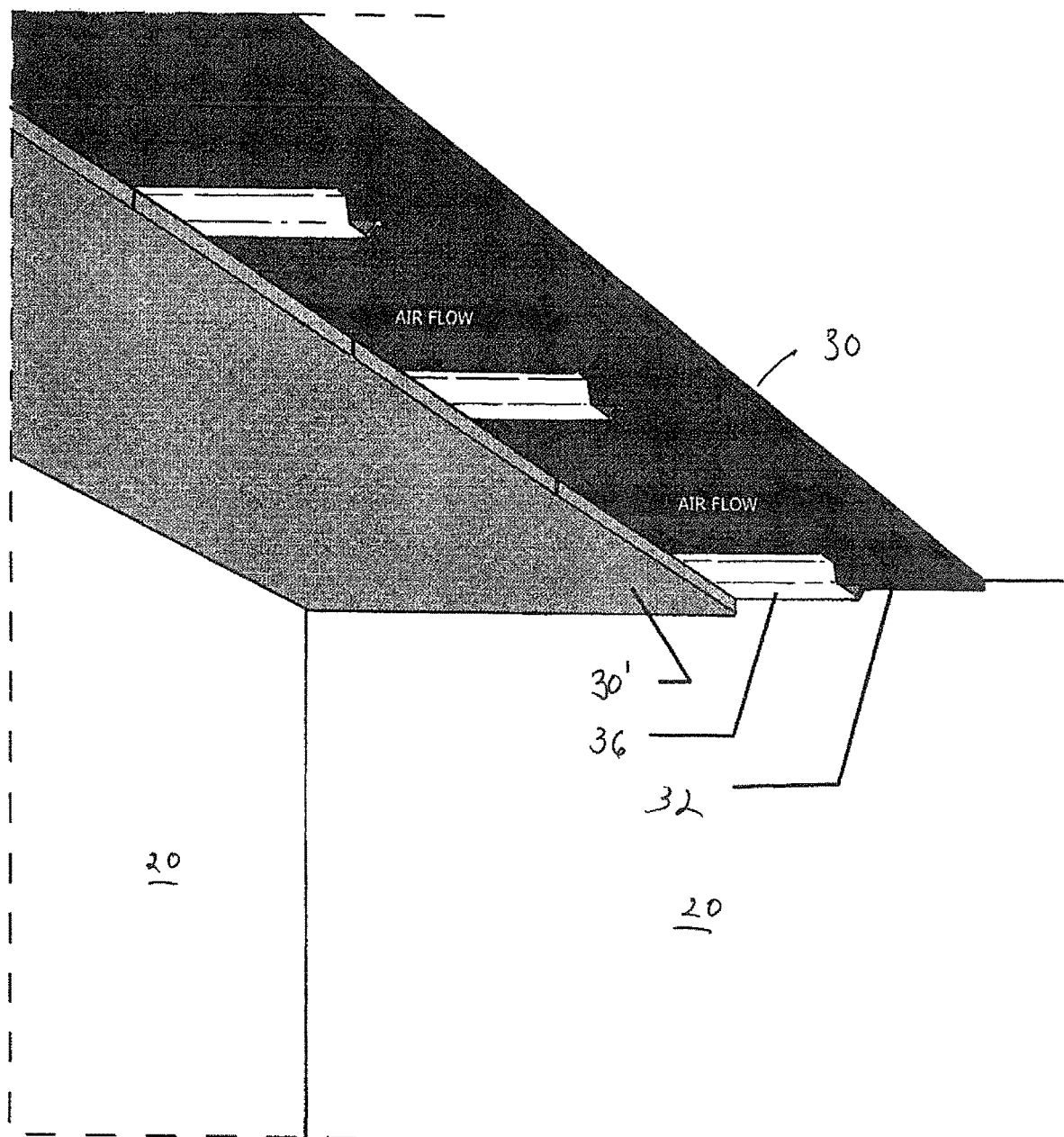
FIG. 9 is a sectional view of a retrofit system ceiling.
Figure 10:
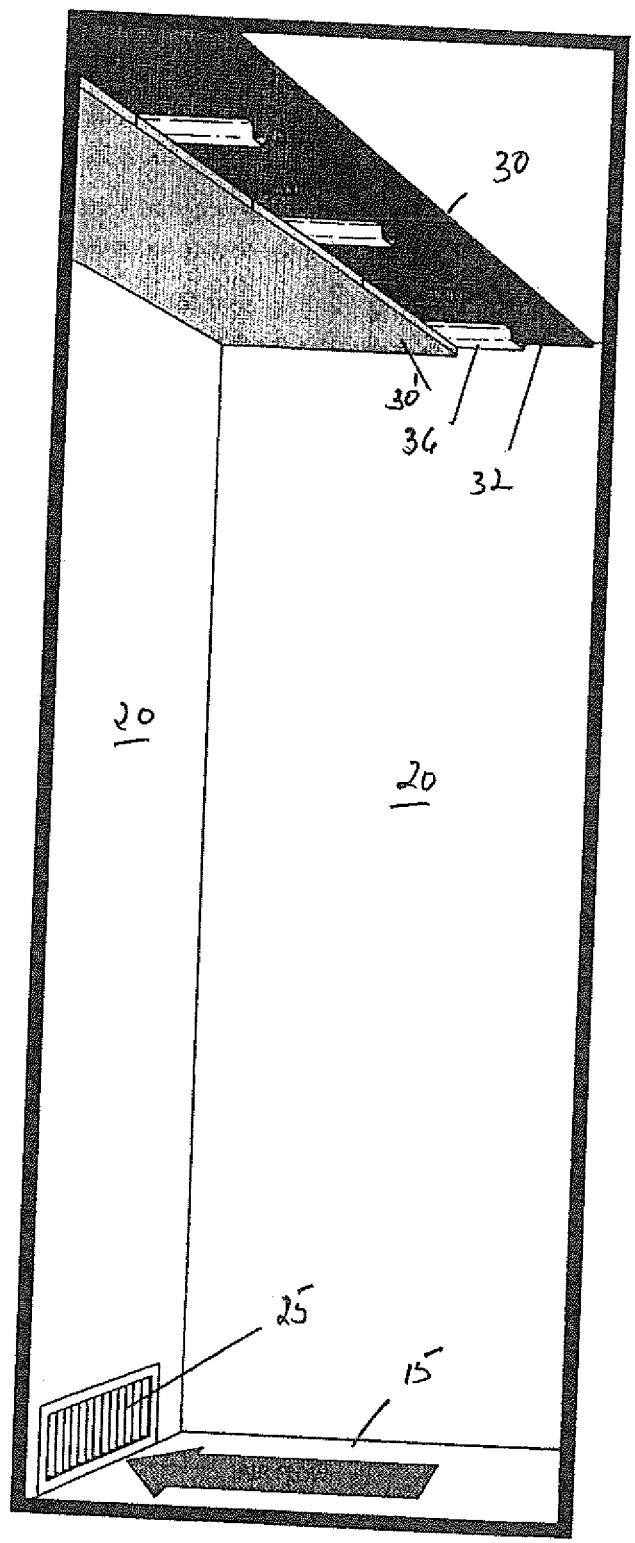
FIG. 10 is a sectional view of a retrofit system.

A thermal convection conversion system may be retrofitted to an existing ceiling structure. Additional parallel strapping strips 36 are attached to the existing ceiling 30. A new ceiling 30' is attached to the additional strapping strips 36. Air plenums 33 are formed between adjacent parallel additional strapping strips 36. An intake vent 25 and an exhaust vent 26 are formed on opposite walls, adjacent to the floor 15, and each are comprised of a vertical cavity 28 between two adjacent studs 22, or separate stand-alone units against the walls. The insulation between the adjacent studs is removed. Each vertical stud cavity 28 or stand-alone unit terminates at the new ceiling 30' in a vented a steel supporting bracket 27 allowing air passage to and from air spaces 38, 39 created adjacent the supporting brackets 37. The air plenums 33 interconnect with the first and second air spaces. The system is further comprised of an intake vent 25 and an exhaust vent 26. See, more particularly, FIGS. 9 and 10.

Figure 11:
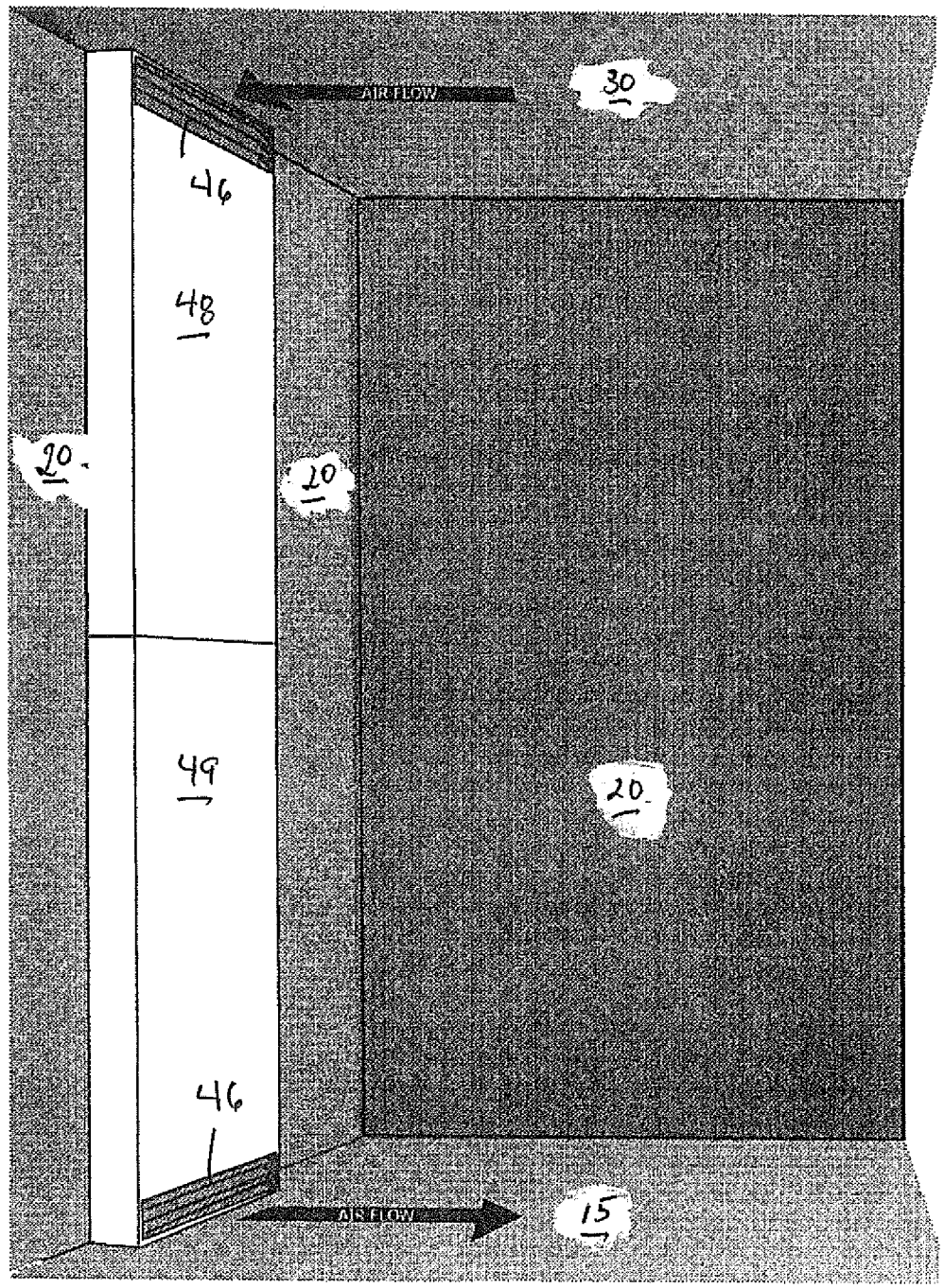
FIG. 11 is a perspective view of a portable system.
Figure 12:
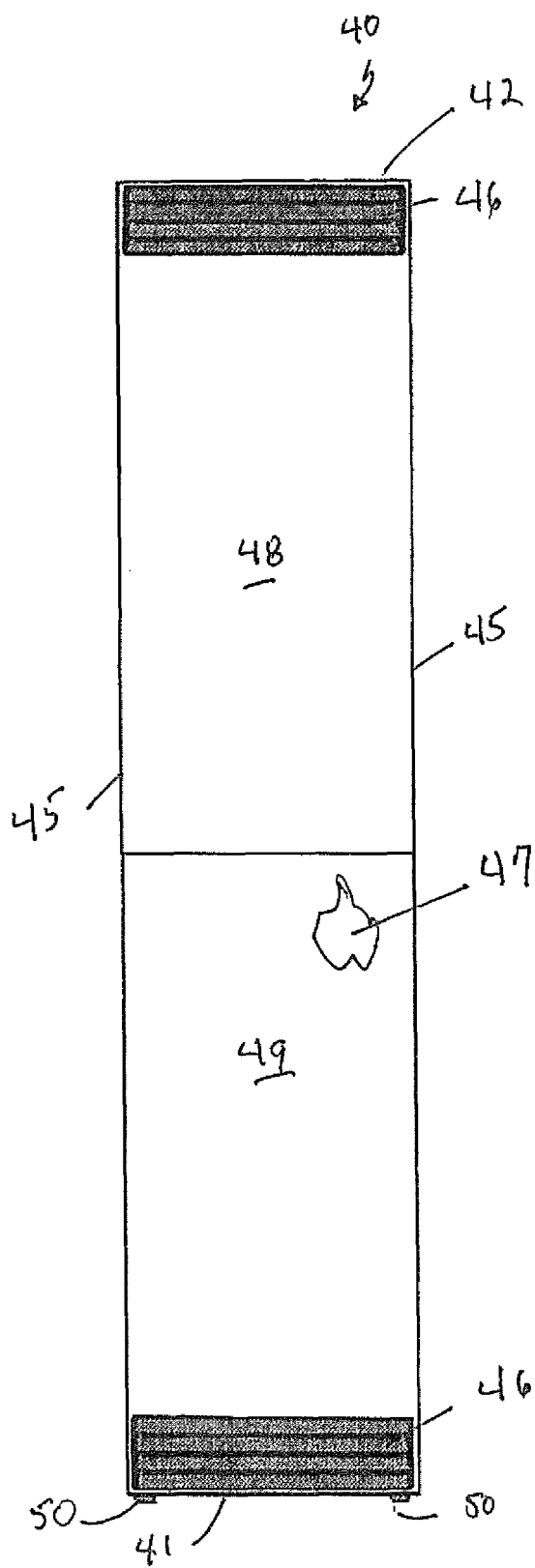
FIG. 12 is a front view of a portable system.
Figure 13:
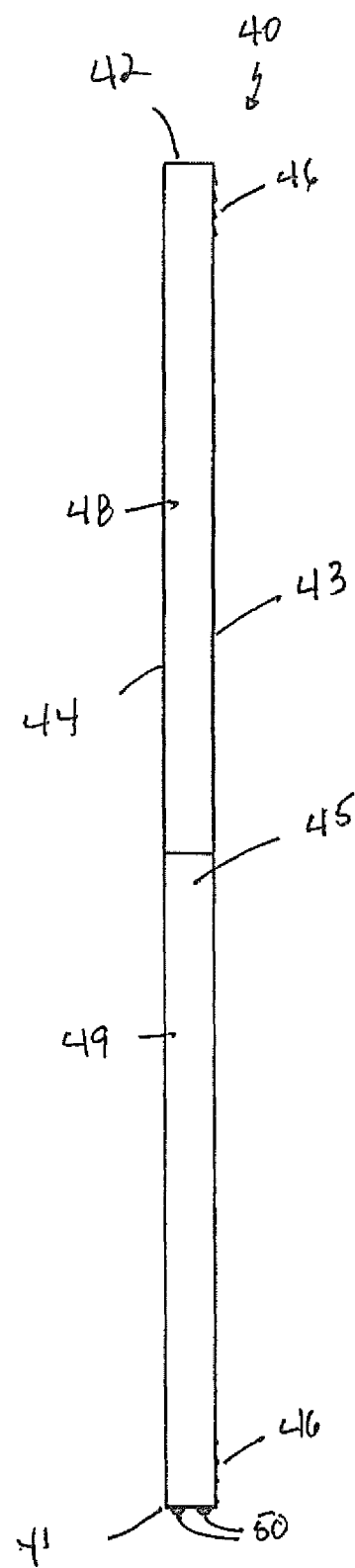
FIG. 13 is a side view of a portable system.

The thermal convection system may take the form of a portable unit comprised of a hollow rectangular housing 40 having a bottom 41 resting on the floor 15 and a top 42 reaching to the ceiling 30. The bottom 41 may have wheels 50. The housing 40 has a front 43, back 44 and two opposite sides 45. Said housing front, back, sides, top and bottom define a housing interior 47. The housing front 43 has two vents 46, one adjacent the housing top 42 and the other adjacent the housing bottom 41. The housing interior 47 contains a motorized fan (not shown) which draws warm air into the top vent 46, downward through the housing interior 47 and out through the bottom vent 46 into the adjacent room 10. The housing 40 may be vertically divided into two sections 48, 49, with one section telescopically fitted into the other. The overall height of the housing may then be adjusted to accommodate different ceiling heights. See, more particularly, FIGS. 11-13.

It is understood that the above-described embodiment is merely illustrative of the application. Other embodiments may be readily devised by those skilled in the art, which will embody the principles of the invention and fall within the spirit and scope thereof.

I claim:

1. A thermal convection conversion system in combination with a room structure having a floor, a plurality of walls and a ceiling, said floor, walls and ceiling defining a room interior, wherein said room interior is heated by a heat source adjacent the floor, wherein said room interior has a heat thermostat installed on one of said walls at an approximate vertical midpoint, wherein said walls are comprised of a plurality of vertical studs, evenly spaced about a room perimeter, said plurality of vertical studs terminating at the ceiling at a top plate of a wall framing, wherein said plurality of vertical studs are covered with a wall board material facing the room interior, wherein said ceiling is comprised of a plurality of joists having top sides and bottom sides, positioned parallel to each other and extending from one wall to an opposite wall, wherein a ceiling material is attached to the joist bottom sides and facing the room interior, comprising:

a plurality of air plenums created at the ceiling, said plurality of air plenums comprising:
an insulating membrane attached to the joist bottom sides thereby covering an entire top of the room interior;
a plurality of strapping strips attached through the insulating membrane to the joist bottoms, each said strapping strip having a longitudinal axis transverse to a longitudinal axis of the joists, said strapping strips extending from a first joist and terminating at a last joist;
the ceiling material attached to the strapping strips;
wherein an air plenum of the plurality of air plenums is thereby created between adjacent strapping strips and are defined by the strapping strips, insulating membrane and ceiling material;
a first air space formed between a first joist and adjacent structural plate;
a second air space created between a last joist and its adjacent structural plate;
wherein the plurality of air plenums are interconnected with the first and second air spaces;
an intake vent and an exhaust vent open to said room interior, each said vent formed on opposite walls and is comprised of a vertical cavity between two adjacent studs, each vertical stud cavity terminating at a top plate supporting bracket allowing air passage to and from the first or second air spaces;
wherein the intake vent has an intake fan at the floor level to draw cold air at floor level into the stud cavity, up into the first air space, through the plurality of air plenums, into the second air space, down to the exhaust vent wherein an exhaust fan at the floor floor level disburses warmed air into the room interior at the floor level, wherein as the air passes through the air plenum, heat energy from the ceiling material heats the air.

2. A thermal convection conversion system in combination with a room structure having a floor, a plurality of walls and an original ceiling, said floor, walls and ceiling defining a room interior, wherein said room interior is heated by a heat source adjacent the floor, wherein said room interior has a heat thermostat installed on one of said walls at an approximate vertical midpoint, wherein said walls are comprised of a plurality of vertical studs, evenly spaced about a room perimeter, said plurality of vertical studs terminating at the ceiling at a top plate of a wall framing, wherein said plurality of vertical studs are covered with a wall board material facing the room interior, wherein said ceiling is comprised of a plurality of joists having top sides and bottom sides, positioned parallel to each other and extending from one wall to an opposite wall, wherein a ceiling material is attached to the joist bottom sides and facing the room interior, comprising:

a plurality of air plenums created at the ceiling, said plurality of air plenums comprising:
a plurality of strapping strips attached to the original ceiling;
a ceiling material attached to the plurality of strapping strips;
wherein an individual air plenum is created between adjacent strapping strips, said individual air plenum defined by the adjacent strapping strips, ceiling, and new ceiling material, said plurality of air plenums extending from a wall of the plurality of walls to an opposite wall;
a first air space formed between the wall and said plurality of air plenums;
a second air space formed between the opposite wall and said plurality of air plenums
wherein the plurality of air plenums are interconnected with the first and second air spaces;
an intake vent and an exhaust vent open to said room interior, each said vent formed on opposite walls and is comprised of a vertical cavity between two adjacent studs, each vertical stud cavity terminating at a top plate supporting bracket allowing air passage to and from the first or second air spaces;
wherein the intake vent has an intake fan at the floor level to draw cold air at floor level into the stud cavity, up into the first air space, through the plurality of air plenums, into the second air space, down the exhaust vent wherein an exhaust fan at the floor level disburses warmed air into the room interior at the floor level, wherein as the air passes through the plurality of air plenums, heat energy from the ceiling material heats the air.

* * * * *